United States Patent
Ayub et al.

(10) Patent No.: US 10,740,107 B2
(45) Date of Patent: Aug. 11, 2020

(54) OPERATION OF A MULTI-SLICE PROCESSOR IMPLEMENTING LOAD-HIT-STORE HANDLING

(71) Applicant: International Business Machines Corporation, Armonk, NY (US)

(72) Inventors: Salma Ayub, Austin, TX (US); Joshua W. Bowman, Austin, TX (US); Jeffrey C. Brownscheidle, Seattle, WA (US); Kurt A. Feiste, Austin, TX (US); Dung Q. Nguyen, Austin, TX (US); Salim A. Shah, Austin, TX (US); Brian W. Thompto, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 249 days.

(21) Appl. No.: 15/170,208

(22) Filed: Jun. 1, 2016

(65) Prior Publication Data
US 2017/0351522 A1  Dec. 7, 2017

(51) Int. Cl.
*G06F 9/38* (2018.01)
*G06F 9/30* (2018.01)

(52) U.S. Cl.
CPC ........ *G06F 9/3838* (2013.01); *G06F 9/30043* (2013.01); *G06F 9/3834* (2013.01); *G06F 9/3891* (2013.01)

(58) Field of Classification Search
CPC .... G06F 9/3826; G06F 9/3838; G06F 9/3834; G06F 9/3859; G06F 9/3861

USPC ................................................ 712/216–218
See application file for complete search history.

(56) References Cited

U.S. PATENT DOCUMENTS

| | | | | |
|---|---|---|---|---|
| 6,108,770 A * | 8/2000 | Chrysos | ............... | G06F 9/30043 712/216 |
| 6,658,559 B1 * | 12/2003 | Arora | ...................... | G06F 9/383 712/225 |
| 6,694,424 B1 * | 2/2004 | Keller | .................... | G06F 9/3834 712/216 |
| 2005/0182918 A1 * | 8/2005 | Col | ....................... | G06F 9/3842 712/218 |
| 2006/0095734 A1 * | 5/2006 | Filippo | ................. | G06F 9/3838 712/218 |
| 2007/0101106 A1 | 5/2007 | Senter et al. | | |

(Continued)

FOREIGN PATENT DOCUMENTS

JP    H11167516 A    6/1999

*Primary Examiner* — Aimee Li
*Assistant Examiner* — William V Nguyen
(74) *Attorney, Agent, or Firm* — Nathan M. Rau

(57) ABSTRACT

Operation of a multi-slice processor that includes a plurality of execution slices and an instruction sequencing unit. Operation of such a multi-slice processor includes: receiving, at the instruction sequencing unit, a load instruction indicating load address data and a load data length; determining a previous store instruction in an issue queue such that store address data for the previous store instruction corresponds to the load address data, wherein the previous store instruction corresponds to a store data length; and generating, in dependence upon the store data length matching the load data length, an indication in the issue queue that indicates a dependency between the load instruction and the previous store instruction.

17 Claims, 7 Drawing Sheets

(56) References Cited

U.S. PATENT DOCUMENTS

| | | | |
|---|---|---|---|
| 2008/0288752 A1* | 11/2008 | Cox | G06F 9/3834 |
| | | | 712/208 |
| 2011/0153986 A1* | 6/2011 | Alexander | G06F 9/383 |
| | | | 712/205 |
| 2011/0320771 A1* | 12/2011 | Mejdrich | G06F 12/0853 |
| | | | 712/201 |
| 2012/0137109 A1* | 5/2012 | Ramani | G06F 9/3826 |
| | | | 712/216 |
| 2012/0144376 A1 | 6/2012 | Van Eijndhoven et al. | |
| 2013/0298127 A1* | 11/2013 | Meier | G06F 9/3834 |
| | | | 718/100 |
| 2014/0108862 A1* | 4/2014 | Rafacz | G06F 9/3826 |
| | | | 714/15 |
| 2014/0181482 A1* | 6/2014 | Smaus | G06F 9/30043 |
| | | | 712/225 |
| 2014/0380023 A1* | 12/2014 | Smaus | G06F 9/3826 |
| | | | 712/216 |
| 2016/0117174 A1* | 4/2016 | Chadha | G06F 9/3838 |
| | | | 712/206 |

* cited by examiner

OPERATION OF A MULTI-SLICE PROCESSOR IMPLEMENTING LOAD-HIT-STORE HANDLING

BACKGROUND

Field of the Invention

The field of the invention is data processing, or, more specifically, methods and apparatus for operation of a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for operation of a multi-slice processor are disclosed in this specification. Such a multi-slice processor includes a plurality of execution slices and a plurality of load/store slices, where the load/store slices are coupled to the execution slices via a results bus. Such a multi-slice processor may further include an instruction sequencing unit. Operation of such a multi-slice processor includes: receiving, at the instruction sequencing unit, a load instruction indicating load address data and a load data length; determining a previous store instruction in an issue queue such that store address data for the previous store instruction corresponds to the load address data, wherein the previous store instruction corresponds to a store data length; and generating, in dependence upon the store data length matching the load data length, an indication in the issue queue that indicates a dependency between the load instruction and the previous store instruction.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
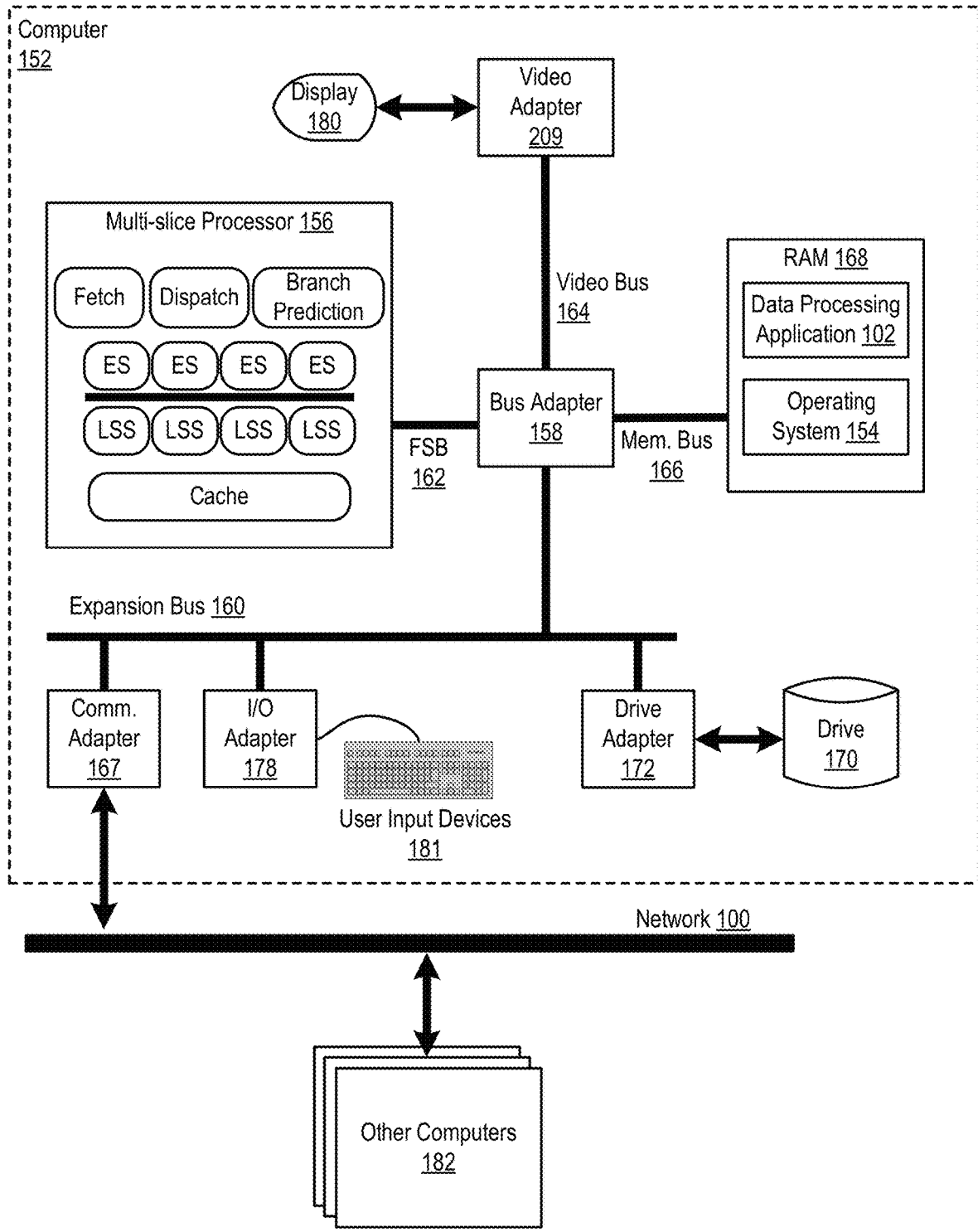
FIG. 1 sets forth a block diagram of an example system configured for operation of a multi-slice processor according to embodiments of the present invention.

Exemplary methods and apparatus for operation of a multi-slice processor in accordance with the present invention are described with reference to the accompanying drawings, beginning with FIG. 1. FIG. 1 sets forth a block diagram of an example system configured for operation of a multi-slice processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('ISS')—where load/store slices may generally be referred to as load/store units. Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
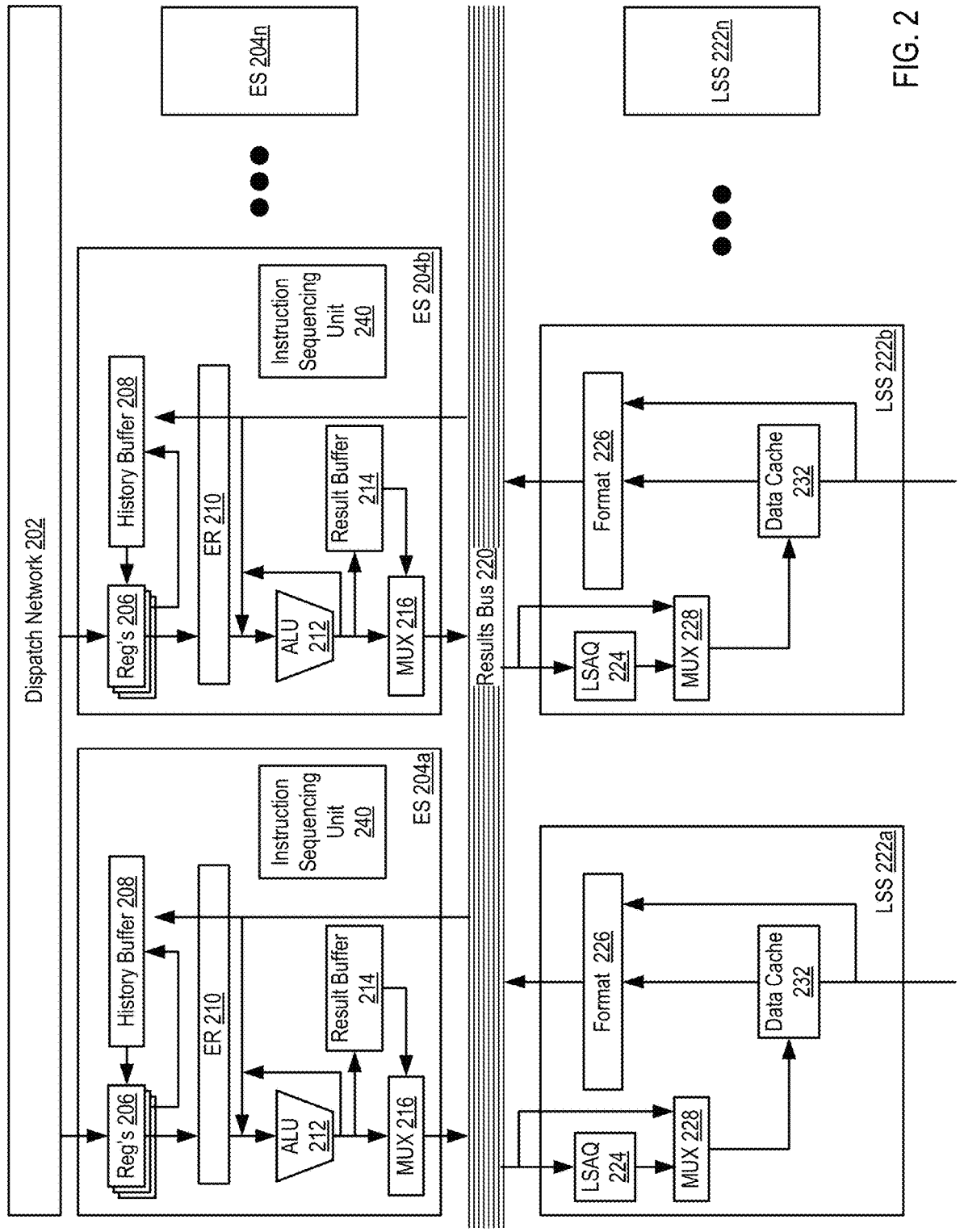
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction targeting a particular logical register and the result of the execution of the instruction. A logical register is an abstraction of a physical register that enables out-of-order execution of instructions that target the same logical register.

When a younger instruction targeting the same particular logical register is received, the entry in the general purpose register is moved to the history buffer, and the entry in the general purpose register is replaced by the younger instruction. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The issue queue may also include a single entry per single instruction, where the single entry handles all operands for the single instruction. The execution reservation station may issue a complete instruction at a time, including the operands for the instruction when the operands for the instruction are ready, for execution—depending on whether the instruction is a load/store instruction or an arithmetic instruction—by the arithmetic logic unit (ALU) (212) or to a load/store slice (222a, 222b, 222c) via the results bus (220). For example, the execution reservation station may determine that data for all operands is available, and in response, the execution reservation station may issue the instruction to the arithmetic logic unit (212).

The arithmetic logic unit (212) depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus (220) may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then be issued to any other slice for performance benefits. Further, an instruction may also be executed by a different execution slice than the execution slice from which the instruction is issued. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a load/store access queue (LSAQ) (224), a multiplexer (MUX) (228), a data cache (232), and formatting logic (226), among other components described below with regard to FIG. 3. The load/store access queue (224) receives load and store operations to be carried out by the load/store slice (222). The formatting logic (226) formats data into a form that may be returned on the results bus (220) to an execution slice as a result of a load or store instruction. The multiplexer (228) may select an input in dependence upon data from the load/store access queue (224) or on receiving data from the results bus.

The example multi-slice processor of FIG. 2 may be configured for flush and recovery operations. A flush and recovery operation is an operation in which the registers (general purpose register and history buffer) of the multi-slice processor are effectively 'rolled back' to a previous state. The term 'restore' and 'recover' may be used, as context requires in this specification, as synonyms. Flush and recovery operations may be carried out for many reasons, including branch mispredictions, exceptions, and the like. Consider, as an example of a typical flush and recovery operation that a dispatcher of the multi-slice processor dispatches over time and in the following order: an instruction A targeting logical register 5, an instruction B targeting logical register 5, and an instruction C targeting logical register 5. At the time instruction A is dispatched, the instruction parameters are stored in the general purpose register entry for logical register 5. Then, when instruction B is dispatched, instruction A is evicted to the history buffer (all instruction parameters are copied to the history buffer, including the logical register and the identification of instruction B as the evictor of instruction A), and the parameters of instruction B are stored in the general purpose register entry for logical register 5. When instruction C is dispatched, instruction B is evicted to the history buffer and the parameters of instruction C are stored in the general purpose register entry for logical register 5. Consider, now, that a flush and recovery operation of the registers is issued in which the dispatch issues a flush identifier matching the identifier of instruction C. In such an example, flush and recovery includes discarding the parameters of instruction C in the general purpose register entry for logical register 5 and moving the parameters of instruction B from the history buffer for instruction B back into the entry of general purpose register for logical register 5. In other words, in this example, instruction B is moved back into the entry of the general purpose register for logical register 5 instead of instruction A because instruction B was not flushed. However, in this example, if instruction C and instruction B been flushed, then instruction A would have been selected to be moved back to the history buffer.

During the flush and recovery operation, in prior art processors, the dispatcher was configured to halt dispatch of new instructions to an execution slice. Such instructions may be considered either target or source instructions. A target instruction is an instruction that targets a logical register for storage of result data. A source instruction by contrast has, as its source, a logical register. A target instruction, when executed, will result in data stored in an entry of a register file while a source instruction utilizes such data as a source for executing the instruction. A source instruction, while utilizing one or more logical registers as its source, may also target another one or more logical registers for storage of the results of instruction. That is, with respect to one logical register, an instruction may be considered a source instruction and with respect to another logical register, the same instruction may be considered a target instruction.

The multi-slice processor in the example of FIG. 2 also includes an instruction sequencing unit (240). While depicted within individual execution slices, in some cases, the instruction sequencing unit may be implemented independently of the execution slices or implemented within dispatch network (202). Instruction sequencing unit (240) may take dispatched instructions and check dependencies of the instructions to determine whether all older instructions with respect to a current instruction have delivered, or may predictably soon deliver, results of these older instructions from which the current instruction is dependent so that the current instruction may execute correctly. If all dependencies to a current instruction are satisfied, then a current instruction may be determined to be ready to issue, and may consequently be issued—regardless of a program order of instructions, where a program order may be determined by an instruction tag (ITAG). Such issuance of instructions may be referred to as an "out-of-order" execution, and the multi-slice processor may be considered an out-of-order machine.

In some cases, a load/store unit receiving an issued instruction, such as a load/store slice, may not yet be able to handle the instruction, and the instruction sequencing unit (240) may keep the instruction queued until such time as the load/store slice may handle the instruction. After the instruction is issued, the instruction sequencing unit (240) may track progress of the instruction based at least in part on signals received from a load/store slice.

Figure 3:
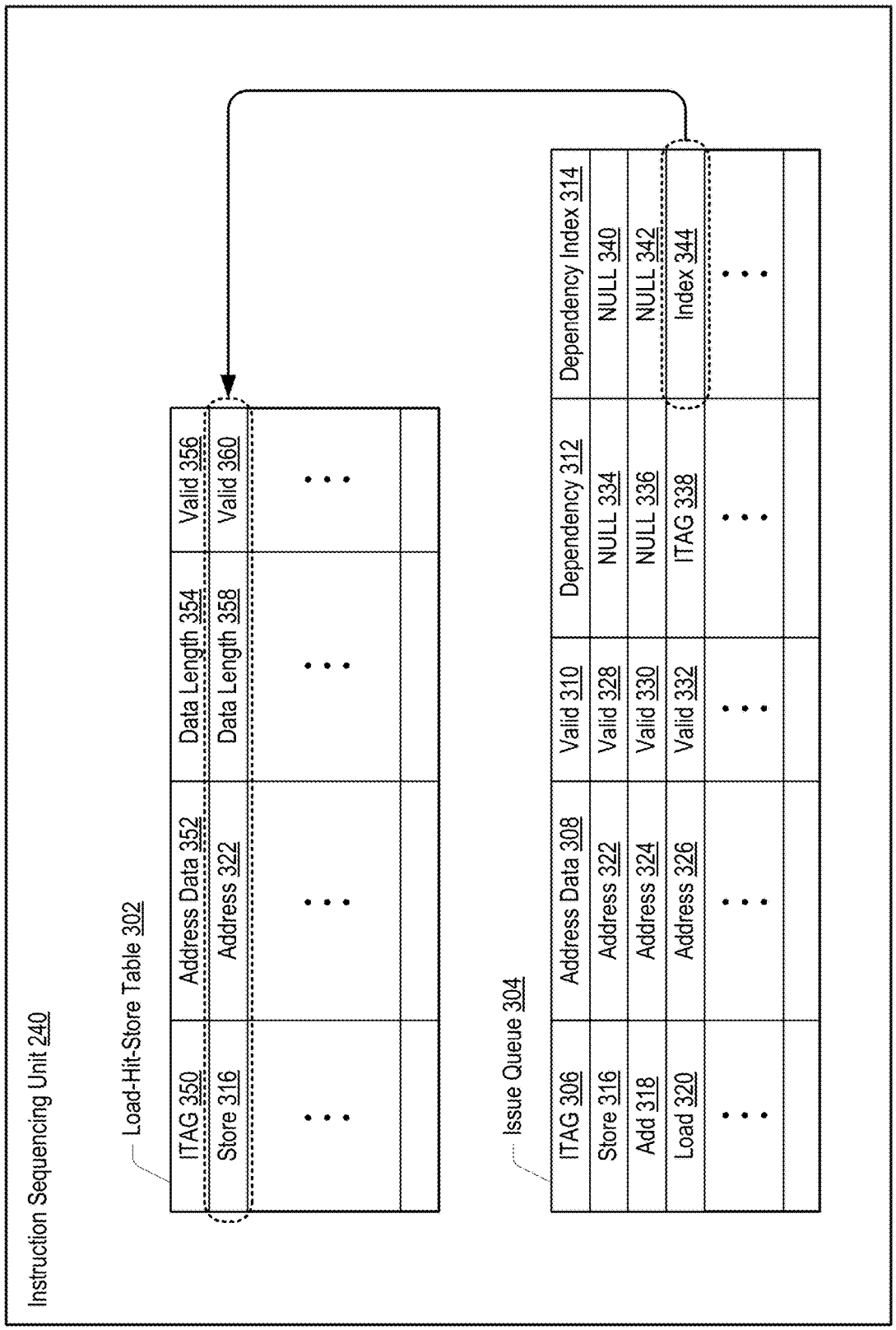
FIG. 3 sets forth a block diagram of a load-hit-store table and an issue queue for an instruction sequencing unit of a multi-slice processor, where the instruction sequencing unit implements load-hit-store handling according to different embodiments.

For further explanation, FIG. 3 sets forth a block diagram depicting a load-hit-store table (302) and an issue queue (304) usable by an instruction sequencing unit (240) configured to include logic for implementing load-hit-store handling.

The issue queue (304) may include an entry for each instruction received from a dispatch network (202), where a given entry of the issue queue (304) may include fields for an ITAG (306), address data (308), valid (310), dependency (312), and dependency index (314).

The ITAG (306) field may indicate an ITAG for an instruction entry that has been queued in the issue queue (304), which in this example, includes ITAGs for instructions store (316), add (318), and load (320).

The address data (308) field may indicate address data for an instruction entry, where the address data may correspond to a raw data field of the instruction corresponding to an address, where the raw data field may be used to calculate an address during issuance of the instruction. In this example, the entries for the store (316), add (318), and load (320) instruction correspond, respectively, to address data (322), address data (324), and address data (326). For example, responsive to a load instruction being sent to the issue queue (304), address data for the load instruction may be compared to address data for store instructions present in the issue queue (304) to determine a value for the dependency (312) field.

The valid (310) field may indicate whether or not an instruction entry is valid or not, where, for example, valid may be indicated by a nonzero value and invalid may be indicated by a zero value. In this example, the entries for the store (316), add (318), and load (320) instruction correspond, respectively, to valid (328), valid (330), and valid (332).

The dependency (312) field may indicate existence of a dependency on another instruction. In this example, the entries for the store (316), add (318), and load (320) instructions correspond, respectively, to NULL (334), NULL (336), and ITAG (338), where a NULL value indicates no dependency, and an ITAG value indicates an ITAG for an instruction on which the entry in the issue queue (304) is dependent. In this example, the ITAG (338) field has an ITAG value that would be equal to the ITAG for the store (316) instruction entry in the load-hit-store table (302). Further, while in this example, the instruction on which the entry in the issue queue (304) is dependent is within a same execution slice, generally, an instruction in a particular issue queue for a particular execution slice may be dependent upon an instruction within any other execution slice within the multi-slice processor.

The dependency index (314) field may indicate, in the case that a dependency exists, an index into, or reference to, an entry in the load-hit-store table (302), where the entry corresponds to an instruction on which the entry in the issue queue (302) is dependent. In this example, the entries for the store (316), add (318), and load (320) instruction correspond, respectively, to NULL (340), NULL (342), and index (344), where a NULL value indicates no dependency index or reference, and an index value indicates an index into the load-hit-store table (302) on which the entry in the issue queue (304) is dependent. In this example, index (344) indexes into the load-hit-store table (302) to reference an entry corresponding to a store (316) instruction in the load-hit-store table (302). In some cases, the issue queue (304) may be represented by different logic configurations corresponding to different data structures that may similarly track one or more entries for instructions to be issued. Further, instructions other than load instructions may be dependent upon store instructions. For example, if the add (318) instruction modified a register used in the store (316) address calculation, then an index value into the load-hit-store table (302) may be stored in the dependency index (314) field of the issue queue (304). Generally, if an instruction writes a register used in a store address calculation, the instruction may need the index (344) entry value in case of an address flush—where in case of a flush, the index (344) entry value may be used to revalidate an entry in the load-hit-store table (302) that was invalidated during dispatch.

The load-hit-store table (302) may include an entry for each store instruction received from a dispatch network (202), where a given entry of the load-hit-store table (302) may include fields for an ITAG (350), address data (352), data length (354), and valid (356). In this example, an entry corresponding to the store (316) instruction includes address (322) data, data length (358), and valid (360) data, where the data length (358) data indicates a number of bits or a number of bytes of data being addressed, and where the valid (360) value indicates whether or not the instruction for the corresponding entry is valid. In some cases, for example where the load-hit-store table (302) corresponds to a circular array, as store instructions are issued, the corresponding valid (356) field may be cleared to indicate that a given store instruction is no longer valid. In other cases, for other data structures in which elements may be arbitrarily inserted or removed, as store instructions are issued, they may be removed from the load-hit-store table (302). The address data (352) may indicate logical registers, immediate values, or a combination of both logical registers and immediate values. However, in this example, at this stage in processing the instruction, a physical or real address may not have been calculated.

In this example, an entry in the issue queue (304) for the load (320) instruction may indicate a dependency on a previous store instruction, store (316) instruction in the load-hit-store table (302), where the store (316) instruction in the load-hit-store table (302) may be indexed or referenced using the dependency index (344) value. For example, a dependency may be based at least in part on the instruction sequencing unit (340) determining that the store (316) instruction is to store data at logical address (322), where logical address (322) may be the same as, or overlap with, logical address (326) of the load (320) instruction. Further, if the valid (360) value for the store (316) instruction in the load-hit-store table (302) indicates validity, then the instruction sequencing unit (240) orders the load (320) instruction for issuance to the load/store slice such that the load (320) instruction is issued after the instruction on which the load (320) instruction is dependent, the store (316) instruction in the load-hit-store table (302). In some cases, the load (320) instruction may indicate a dependence on an instruction within the load-hit-store table (302). However, for example at the instruction dispatch stage, if the validity (356) field indicates an invalid entry, then the instruction sequencing unit (240) determines that no valid dependence exists, and the instructions are ordered as if the instructions were independent of one another. Further, if a store instruction has issued, the corresponding store instruction entry in the load-hit-store table (302) may be updated to indicate an invalid state in the validity (356) field.

Figure 4:
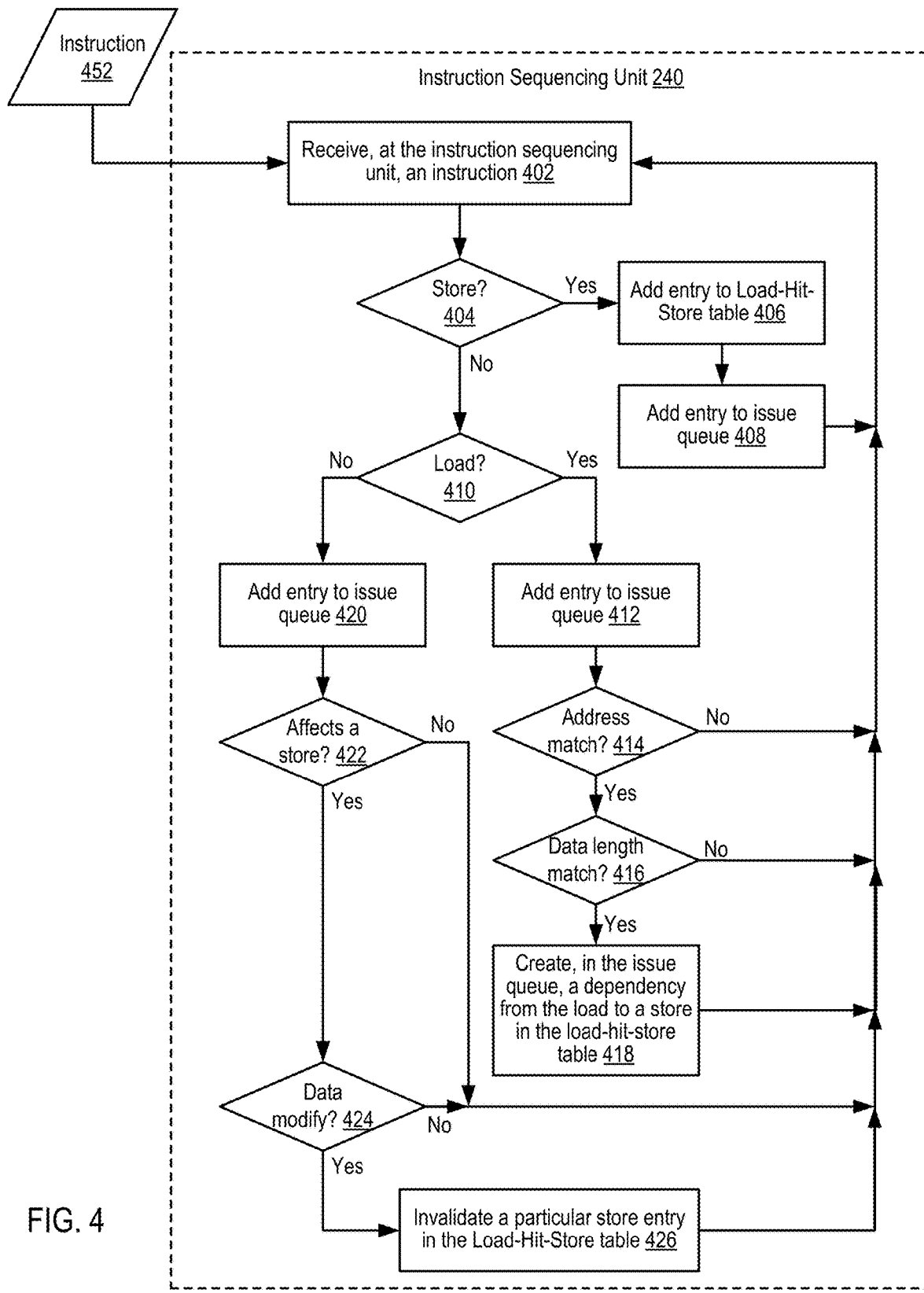
FIG. 4 sets forth a flow chart illustrating an exemplary method of operation of a multi-slice processor configured to implement load-hit-store handling according to different embodiments.

For further explanation, FIG. 4 sets forth a flow chart illustrating an exemplary method of handling of instructions, including load-hit-store handling, received at an instruction sequencing unit (240) of an execution slice (204) of a multi-slice processor (156). The method of FIG. 4 may be carried out by a multi-slice processor similar to that in the examples of FIGS. 1-3. Such a multi-slice processor may include an instruction sequencing unit (240) that includes a load-hit-store table (302) and an issue queue (304), as described above with regard to FIG. 3.

The method of FIG. 4 includes receiving (402), at the instruction sequencing unit (240), an instruction (452). Receiving (402) the instruction (452) may be carried out by the instruction sequencing unit (240) receiving the instruction (452) from the dispatch network (202) along one of the data lines from the dispatch network (202) to an execution slice (204) depicted in FIG. 2. Further, respective instruction sequencing units (240) of the multiple execution slices may receive respective instructions from the dispatch network (202).

The method of FIG. 4 also includes determining (404) whether or not the received instruction (452) is a store instruction. If the instruction (452) is a store instruction, then the instruction sequencing unit (240) adds (406) an entry to load-hit-store table (302) corresponding to the store instruction (452), and adds (408) an entry to the issue queue (304) corresponding to the store instruction (452).

Adding (406) an entry to the load-hit-store table (302) may be carried out by the instruction sequencing unit (240) creating an entry with field values for ITAG (350), address data (352), data length (354), and valid (356). The valid (356) value may be set when a store instruction is dispatched and added to the load-hit-store table (302), and the valid (356) value may be cleared in dependence upon some event indicating that it is safe to issue dependent instructions. For the created entry in the load-hit-store table (302), the ITAG (350) field may store an ITAG for the received instruction (452), the address data (352) may store data corresponding to an address for the store instruction, the data length (352) field may store a number of bytes or bits of data being addressed by the store instruction, and the valid (356) field may be set to valid.

Adding (408) an entry to the issue queue (304) may be carried out by the instruction sequencing unit (240) creating an entry with field values for ITAG (306), address data (308), valid (310), dependency (312), and dependency index (314). For the created entry in the issue queue (302), the ITAG (350) field may store an ITAG for the received instruction (452), the address data (352) may store data corresponding to an address for the store instruction, the valid (310) field may be set to indicate validity, the dependency (312) field may be set to a null value to indicate that the store is not dependent on another instruction, and the dependency index (314) field may be set to a null value to also indicate that no dependent instruction is referenced. The instruction sequencing unit (240) may then proceed to receive (402) another instruction.

The method of FIG. 4 also includes—in the case that the instruction (452) is not a store instruction as determined at (404)—determining (410) whether or not the instruction (452) is a load instruction. If the instruction (452) is a load instruction, then the instruction sequencing unit (240) adds (412) an entry to the issue queue (304). Adding (412) an entry to the issue queue (304) may be carried out as described above with regard to adding (408) an entry to the issue queue (304). While in this example, in the case of an instruction not being a store instruction as determined at (404), adding (420) a non-load instruction and adding (412) a load instruction to the issue queue is performed after determining whether the instruction is a load instruction or not, in other cases, the addition of an instruction to the issue queue (304) may be performed at a later step. In other words, the order of steps in FIG. 4 may be arranged differently to similarly update and maintain the load-hit-store table (302) and issue queue (304).

The method of FIG. 4 also includes—in the case that the instruction (452) is not a store instruction as determined at (404)—determining (414) an address match. Determining (414) an address match may be carried out by the instruction sequencing unit (240) comparing the address data for the received instruction (452), a load instruction, with address data in an address data (352) field for each entry of the load-hit-store table (302). If there is no address match between the load instruction (452) and any store instruction in the load-hit-store table (302) as determined at (414), then the instruction sequencing unit (240) may then proceed to receive (402) another instruction.

The method of FIG. 4 also includes—in the case that address data for the instruction (452) matches address data for a store instruction in the load-hit-store table (302) as determined at (414)—determining (416) whether an address length for the received load instruction (452) matches the address length for the entry for the store instruction in the load-hit-store table (302) for which there was an address match as determined at (414). If the data lengths are different values as determined at (416), then there is no match, and the instruction sequencing unit (240) may then proceed to receive (402) another instruction. Generally, there is an increased likelihood of a true dependency in cases where the data sizes, or data lengths for loads and stores match.

The method of FIG. 4 also includes—in the case that a data length for the instruction (452) matches the data length for a store instruction in the load-hit-store table (302) as determined at (416)—creating (418), in the issue queue (304), a dependency from the load instruction (452) to a store instruction in the load-hit-store table (302) for which there was a logical address match. Creating (418) a dependency may be carried out by the instruction sequencing unit (240), within an entry for the load instruction (452), storing an ITAG value within the dependency (312) field, and storing an index value within the dependency index (314) field. For example, the stored ITAG value may be the ITAG for the particular store instruction in the load-hit-store table (302) for which there was an address match with the load instruction (452), and the dependency index (314) value may be defined, or specified, to reference into the entry for the particular store instruction in the load-hit-store table (302) entry. The dependency index (314) value may be an index value, a pointer, or some other type of reference corresponding to the implementation of an entry for the load-hit-store table (302).

The method of FIG. 4 also includes—in the case that the received instruction (452) is not a load instruction as determined at (410)—adding (420) an entry to the issue queue (304). Adding (420) an entry to the issue queue (304) may be carried out as described above with regard to adding (408) an entry to the issue queue (304).

The method of FIG. 4 also includes determining (422) whether the instruction (452) affects an address used by a store instruction in the load-hit-store table (302). Determining (422) whether the instruction (452) affects an address used by a store instruction may be carried out by the instruction sequencing unit (240) comparing one or more target registers used by the instruction (452) to one or more registers used in calculating address data by each store instruction entry of the load-hit-store table (302). If there is no address of a store instruction in the load-hit-store table (302) is affected by performance of the instruction (452), then the instruction sequencing unit (240) may then proceed to receive (402) another instruction. Otherwise, if the instruction (452) affects an address used by a store instruction in the load-hit-store table (302), then the corresponding valid field may be cleared or set to a NULL value.

The method of FIG. 4 also includes—in the case that the received instruction (452) has a target register that does match a register used for address data by any store instruction in the load-hit-store table (302) as determined at (422)—determining (424) whether the received instruction (452) modifies data within the register that matches a particular store instruction in the load-hit-store table (302). If the received instruction (452) does not modify the register data, then the instruction sequencing unit (240) may then proceed to receive (402) another instruction.

The method of FIG. 4 also includes—in the case that the received instruction (452) does modify data at the address data matching a particular store instruction in the load-hit-store table (302) as determined at (424)—invalidating (426) the particular store instruction entry in the load-hit-store table (302). Invalidating (426) the particular store instruction entry may be carried out by the instruction sequencing unit (240) setting the valid (356) field of the entry to indicate an invalid status.

In this way, the instruction sequencing unit (240) may receive and process instructions such that information is generated with regard to dependencies between instructions, and with regard to data lengths for the instructions, to order instructions to reduce false dependencies between instructions.

Figure 5:
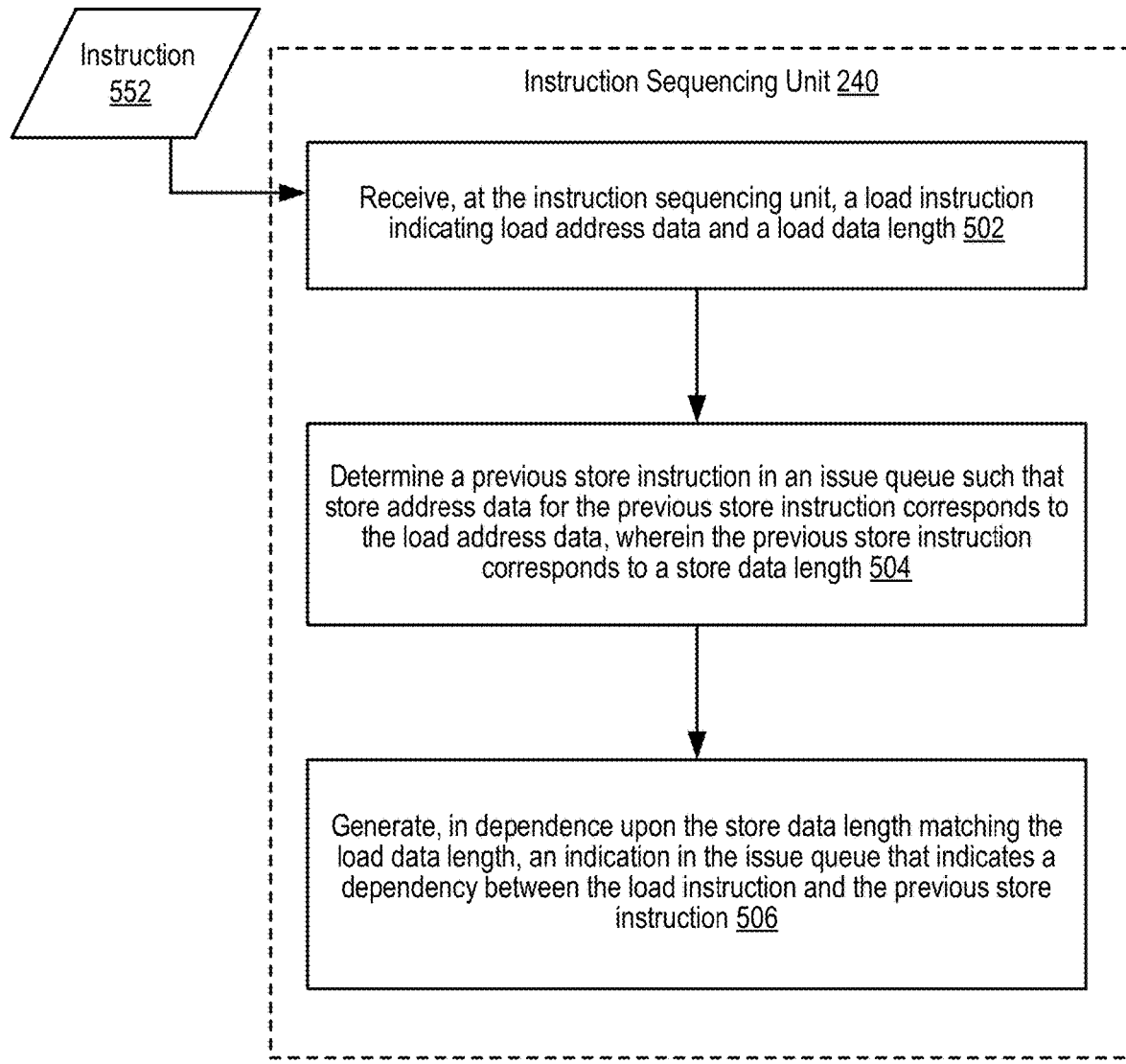
FIG. 5 sets forth a flow chart illustrating an exemplary method of operation of a multi-slice processor configured to implement load-hit-store handling according to different embodiments.

For further explanation, FIG. 5 sets forth a flow chart illustrating an exemplary method of operation of a multi-slice processor implementing load-hit-store handling. The method of FIG. 5 may be carried out by a multi-slice processor similar to that in the examples of FIGS. 1-3. Such a multi-slice processor may include a plurality of execution slices and a plurality of instruction sequencing units, as described above with regard to FIGS. 1-3.

The method of FIG. 5 includes receiving (502), at an instruction sequencing unit (240), a load instruction (552) indicating load address data and a load data length. Receiving (502) the load instruction (552) may be carried out by the instruction sequencing unit (240) receiving the instruction (452) from the dispatch network (202) along one of the data lines from the dispatch network (202) to an execution slice (204) depicted in FIG. 2. The address data and the load data length may be determined from decoding the instruction to identify fields corresponding to the logical or effective address data and the load data length, where the instruction sequencing unit (240) may use the logical address data for performing the steps of the method of FIG. 5. Further, the address data may be calculated based on address data from one or more base registers, or from adding an immediate value to an address in a given base register storing an address.

The method of FIG. 5 also includes determining (504) a previous store instruction in an issue queue such that store address data for the previous store instruction corresponds to the load address data, where the previous store instruction corresponds to a store data length. Determining (504) the previous store instruction may be carried out by the instruction sequencing unit (240) comparing the address data for the load instruction (552) with address data for each entry of the load-hit-store table (302) maintained by the execution slice corresponding to the instruction sequencing unit (240). While this example considers the case where there is an address match, in examples where there is no address match between the address data for the load instruction and a store instruction in the load-hit-store table, no dependency information is recorded for the load instruction, and the load instruction is added to the issue queue (304). Further, in some examples, the load-hit-store table (302) may not store all previous store instructions due to a previous store entry being overwritten or due to a previous store entry being updated to be invalid.

The method of FIG. 5 also includes generating (506), in dependence upon the store data length matching the load data length, an indication in the issue queue (304) that indicates a dependency between the load instruction (552) and the previous store instruction. Generating (506) the indication in the issue queue (304) that indicates a dependency may be carried out by the instruction sequencing unit (240) comparing the store data length for the received load instruction (552) to the data length stored in an entry for the previous store instruction that matched the address data for the received load instruction (552). By not creating a dependency unless both the address data and the data length match, the instruction sequencing unit (240) may reduce the number of instances in which a false dependency exists between load and store instructions.

Further, generating (506) the indication in the issue queue (304) that indicates a dependency may be carried out by the instruction sequencing unit (240) creating an entry in the issue queue (304) for the load instruction (552) and storing, within the dependency (312) field of the entry, an ITAG value for the previous store instruction, and also storing, within dependency index (314) field of the entry, a reference or index for identifying the particular entry for the previous store instruction in the load-hit-store table (302).

In this way, before issuing the received load instruction (552), the instruction sequencing unit (240) may check whether any dependencies exist for the load instruction (552) and either issue the load instruction (552) or wait to issue the load instruction (552) until after the store instruction on which the load instruction (552) is dependent is either issued or invalidated.

Figure 6:
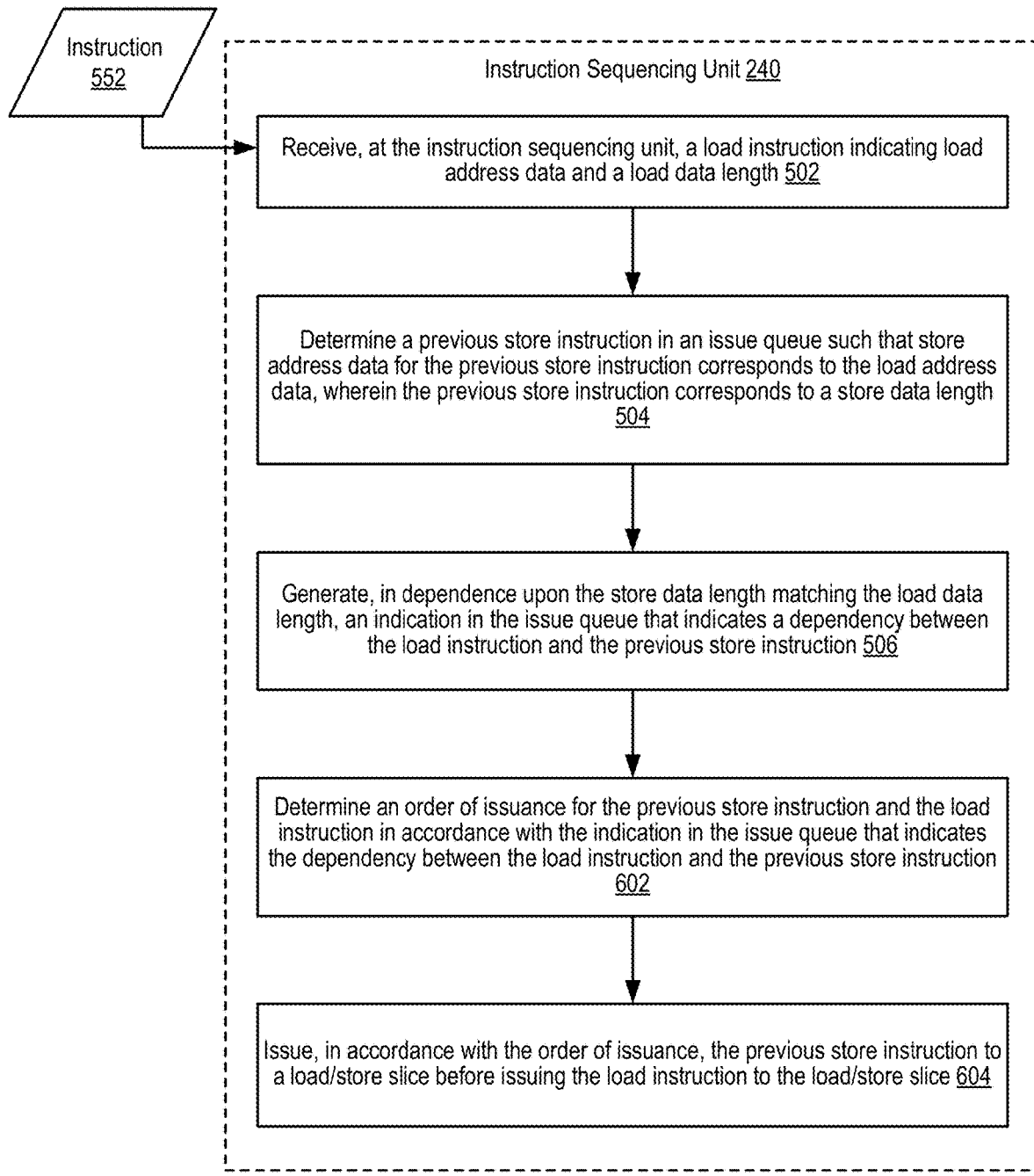
FIG. 6 sets forth a flow chart illustrating an exemplary method of operation of a multi-slice processor configured to implement load-hit-store handling according to different embodiments.

For further explanation, FIG. 6 sets forth a flow chart illustrating an exemplary method of operation of a multi-slice processor implementing load-hit-store handling. The method of FIG. 6 may be carried out by a multi-slice processor similar to that in the examples of FIGS. 1-3. Such a multi-slice processor may include a plurality of execution slices and a plurality of instruction sequencing units, as described above with regard to FIGS. 1-3.

The method of FIG. 6 is similar to the method of FIG. 5 in that the method of FIG. 6 also includes: receiving (502), at an instruction sequencing unit (240), a load instruction (552) indicating load address data and a load data length; determining (504) a previous store instruction in an issue queue such that store address data for the previous store instruction corresponds to the load address data, where the previous store instruction corresponds to a store data length;

and generating (506), in dependence upon the store data length matching the load data length, an indication in the issue queue (304) that indicates a dependency between the load instruction (552) and the previous store instruction.

The method of FIG. 6 differs from the method of FIG. 5, however, in that the method of FIG. 6 further includes: determining (602) an order of issuance for the previous store instruction and the load instruction in accordance with the indication in the issue queue that indicates the dependency between the load instruction and the previous store instruction; and issuing (604), in accordance with the order of issuance, the previous store instruction to a load/store slice before issuing the load instruction to the load/store slice.

Determining (602) an order of issuance may be carried out by the instruction sequencing unit (240) accessing the dependency (312) field of the issue queue (304) to determine whether a given instruction is dependent upon another instruction—where given a dependency the given instruction is ordered to issue after the instruction upon which the given instruction is dependent has issued or has been invalidated. Further, while the dependency (312) field of the issue queue (304) indicates a dependency upon an instruction, the instruction sequencing unit (240) may also determine one or more other dependencies to resolve before issuing the given instruction. In this example, the instruction sequencing unit (240) may access the issue queue (304) to determine that the load instruction (552) received is dependent upon the previous store instruction in the load-hit-store table (302) based on the dependency (312) field identifying an ITAG (338) and an index (344) for referencing the previous store instruction within the load-hit-store table (302). Accessing the load-hit-store table (302) based on index (344) may identify an entry for the previous store instruction.

Issuing (604), in accordance with the order of issuance, the previous store instruction to a load/store slice before issuing the load instruction to the load/store slice may be carried out by the instruction sequencing unit (240) delaying issuance of the load instruction (552) until the dependency has cleared, such as when a store has been performed or a store has reached a stage such that it may be considered to have been performed. In this way, the instruction sequencing unit (240) may ensure that load instruction that are dependent upon previous store instructions are not issued prematurely.

Figure 7:
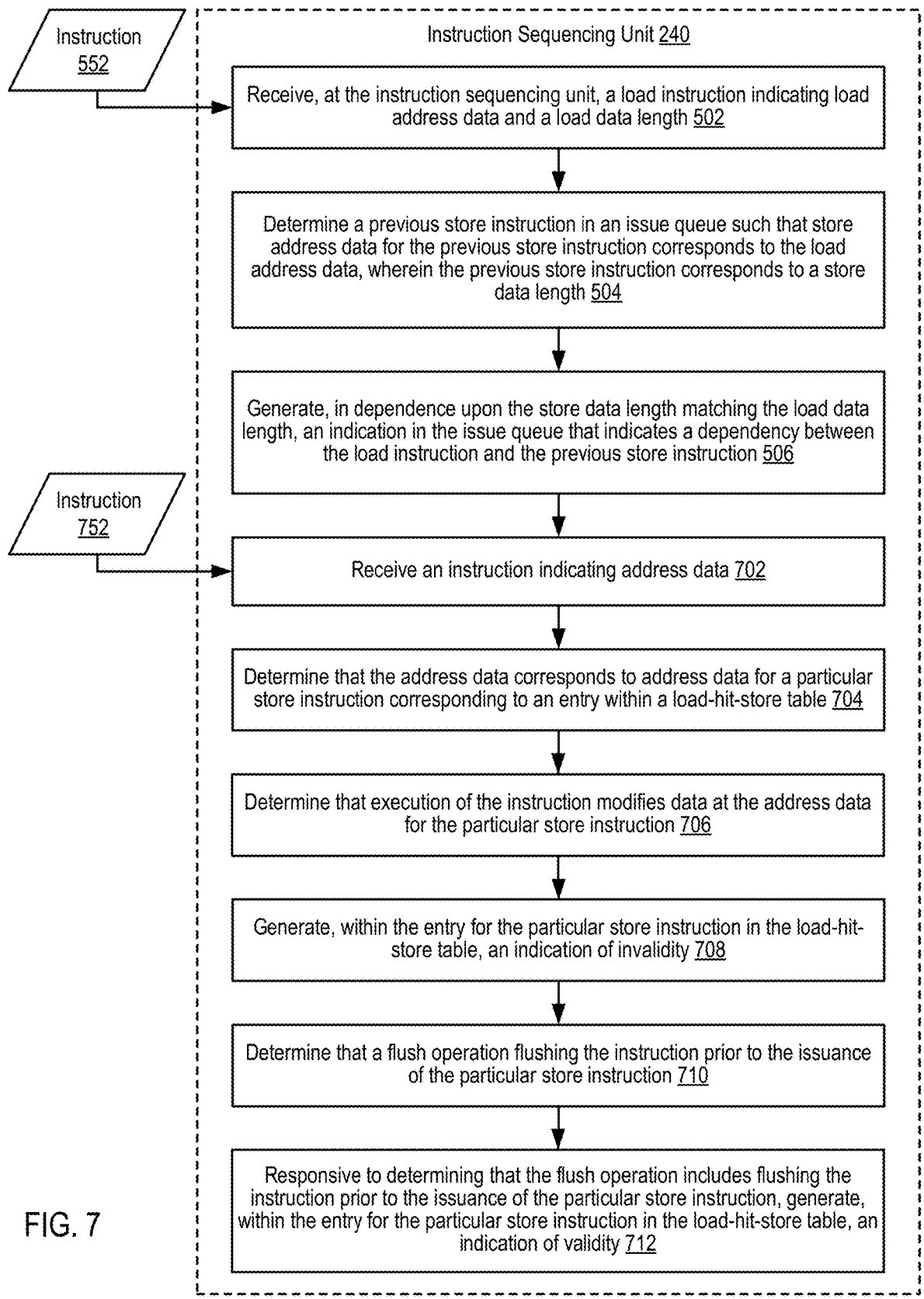
FIG. 7 sets forth a flow chart illustrating an exemplary method of operation of a multi-slice processor configured to implement load-hit-store handling according to different embodiments.

For further explanation, FIG. 7 sets forth a flow chart illustrating an exemplary method of operation of a multi-slice processor implementing load-hit-store handling. The method of FIG. 7 may be carried out by a multi-slice processor similar to that in the example of FIGS. 1-3. Such a multi-slice processor may include a plurality of execution slices and a plurality of instruction sequencing units, as described above with regard to FIGS. 1-3.

The method of FIG. 7 is similar to the method of FIG. 5 in that the method of FIG. 7 also includes: receiving (502), at an instruction sequencing unit (240), a load instruction (552) indicating load address data and a load data length; determining (504) a previous store instruction in an issue queue such that store address data for the previous store instruction corresponds to the load address data, where the previous store instruction corresponds to a store data length; and generating (506), in dependence upon the store data length matching the load data length, an indication in the issue queue (304) that indicates a dependency between the load instruction (552) and the previous store instruction.

The method of FIG. 7 differs from the method of FIG. 5, however, in that the method of FIG. 7 further includes: receiving (702) an instruction indicating a target register; determining (704) that the target register corresponds to a register for a particular store instruction corresponding to an entry within a load-hit-store table (302); determining (706) that execution of the instruction modifies data at the register for the particular store instruction; generating (708), within the entry for the particular store instruction in the load-hit-store table (302), an indication of invalidity; determining (710) that a flush operation flushing the instruction prior to the issuance of the particular store instruction; and responsive to determining (710) that the flush operation includes flushing the instruction prior to the issuance of the particular store instruction, generating (712), within the entry for the particular store instruction in the load-hit-store table, an indication of validity. Further, in some examples, a single instruction may invalidate multiple store instruction entries if the target register for the single instruction is used in the multiple store instructions.

Receiving (702) an instruction (752) indicating a target register may be carried out by the instruction sequencing unit (240) receiving the instruction (452) from the dispatch network (202) along one of the data lines from the dispatch network (202) to an execution slice (204) depicted in FIG. 2. The target register may be determined from decoding the instruction to identify fields corresponding to the target register. Further, in the case of a non-store instruction, the target register may be considered to be one or more target registers that may be affected, and in such an example, data lengths are not relevant and are not compared.

Determining (704) that the target register corresponds to a register for a particular store instruction corresponding to an entry within the load-hit-store table (302) may be carried out by the instruction sequencing unit (240) comparing the target register for the received instruction (752), with registers used for each entry of the load-hit-store table (302). In this example, there is register match between the instruction (752) target register and a register for an entry for a particular store instruction in the load-hit-store table (302).

Determining (706) that the execution of the instruction modifies data at the register for the particular store instruction may be carried out by the instruction sequencing unit (240) determining that the instruction is one of a set of instructions that may modify data stored within the register. For example, an addition instruction may add a value to memory location referenced by the register of the particular store instruction. In this example, such an addition would render invalid any dependency that a subsequent load instruction had on the particular store instruction since the addition instruction would have modified the data at the address data location stored in the register before the load instruction were to load the data at the address data location stored in the register. Therefore, in this case, any dependency a subsequent load instruction were to identify to the particular store instruction in the load-hit-store table (302) would be invalid.

Generating (708), within the entry for the particular store instruction in the load-hit-store table (302), an indication of invalidity may be carried out—according to the determination that the received instruction (752) has rendered invalid subsequent dependencies on the particular store instruction—by the instruction sequencing unit setting the valid field (356) of the entry for the particular store instruction to indicate an invalid state.

As noted above, this setting of invalidity is based on the instruction (752) executing to modify register data used in an address calculation. Further, if, prior to the instruction (752) issuing, or taking effect, the instruction (752) is flushed, then the effect of invalidity by the instruction (752) may also be undone, as described below.

Determining (710) that a flush operation flushing the instruction (752) prior to the issuance of the particular store instruction may be carried out by the instruction sequencing unit (240) determining that a received flush signal includes the instruction (752) being flushed while the instruction (752) is still in the issue queue (302).

Responsive to determining (710) that the flush operation includes flushing the instruction prior to the issuance of the particular store instruction, generating (712), within the entry for the particular store instruction in the load-hit-store table (302), an indication of validity may be carried out by the instruction sequencing unit (240) accessing the valid field (356) for the entry corresponding to the particular store instruction and setting the valid field (356) to indicate a valid state.

In this way, the instruction sequencing unit (240) may maintain the state for store instructions in the load-hit-store table (302) such that any determinations of dependency on store instruction in the load-hit-store table (302) are valid, thereby preventing false dependencies and undue delays from instruction waiting for stores to complete.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of operation of a multi-slice processor, the multi-slice processor including a plurality of execution slices and an instruction sequencing unit, wherein the method comprises:
    receiving, at the instruction sequencing unit, a load instruction indicating load address data and a load data length;
    determining a previous store instruction in an issue queue such that store address data for the previous store instruction corresponds to the load address data, wherein the previous store instruction corresponds to a store data length;
    generating, in dependence upon the store data length matching the load data length, an indication in the issue queue that indicates a dependency between the load instruction and the previous store instruction;
    receiving an instruction indicating a target register;
    determining that the target register corresponds to a register for a particular store instruction corresponding to an entry within a load-hit-store table;
    determining, by the instruction sequencing unit, that the execution of the received instruction indicating the target register modifies data at the register for the particular store instruction, wherein the register data being modified will be used by the particular store instruction in an address calculation; and
    generating, based on the determination that execution of the received instruction indicating the target register modifies the register data used by the particular store instruction in the address calculation, an indication of invalidity within the entry for the particular store instruction in the load-hit-store table.

2. The method of claim 1, wherein the indication in the issue queue that indicates the dependency indicates that the load instruction is dependent upon the previous store instruction.

3. The method of claim 2, wherein the indication comprises a field setting of an entry for the load instruction in the issue queue, wherein the dependency between the load instruction and the previous store instruction is based at least upon the load instruction targeting a register used by the store instruction, and wherein the field setting includes an index into an entry of a load-hit-store table that corresponds to the previous store instruction.

4. The method of claim 2, further comprising:
    determining an order of issuance for the previous store instruction and the load instruction in accordance with the indication in the issue queue that indicates the dependency between the load instruction and the previous load instruction; and
    issuing, in accordance with the order of issuance, the previous store instruction to a load/store slice before issuing the load instruction to the load/store slice.

5. The method of claim 1, wherein the previous store instruction corresponds to an entry of a load-hit-store table, and wherein the entry is created to include an indication of validity, address data, and an indication of a data length corresponding to a number of bytes to store.

6. The method of claim 1, further comprising:
    determining that a flush operation includes flushing the instruction prior to the issuance of the particular store instruction; and
    responsive to determining that the flush operation includes flushing the instruction prior to the issuance of the particular store instruction, generating, within the entry for the particular store instruction in the load-hit-store table, an indication of validity.

7. A multi-slice processor comprising:
    a plurality of execution slices and an instruction sequencing unit, wherein the multi-slice processor is configured to carry out:
    receiving, at the instruction sequencing unit, a load instruction indicating load address data and a load data length;
    determining a previous store instruction in an issue queue such that store address data for the previous store instruction corresponds to the load address data, wherein the previous store instruction corresponds to a store data length;
    generating, in dependence upon the store data length matching the load data length, an indication in the issue queue that indicates a dependency between the load instruction and the previous store instruction;
    receiving an instruction indicating a target register;
    determining that the target register corresponds to a register for a particular store instruction corresponding to an entry within a load-hit-store table;
    determining, by the instruction sequencing unit, that the execution of the received instruction indicating the target register modifies data at the register for the particular store instruction, wherein the register data being modified will be used by the particular store instruction in an address calculation; and
    generating, based on the determination that execution of the received instruction indicating the target register modifies the register data used by the particular store instruction in the address calculation, an indication of invalidity within the entry for the particular store instruction in the load-hit-store table.

8. The multi-slice processor of claim 7, wherein the indication in the issue queue that indicates the dependency indicates that the load instruction is dependent upon the previous store instruction.

9. The multi-slice processor of claim 8, wherein the indication comprises a field setting of an entry for the load instruction in the issue queue, wherein the dependency between the load instruction and the previous store instruction is based at least upon the load instruction targeting a register used by the store instruction, and wherein the field setting includes an index into an entry of a load-hit-store table that corresponds to the previous store instruction.

10. The multi-slice processor of claim 8, wherein the multi-slice processor is further configured to carry out:
   determining an order of issuance for the previous store instruction and the load instruction in accordance with the indication in the issue queue that indicates the dependency between the load instruction and the previous load instruction; and
   issuing, in accordance with the order of issuance, the previous store instruction to a load/store slice before issuing the load instruction to the load/store slice.

11. The multi-slice processor of claim 7, wherein the previous store instruction corresponds to an entry of a load-hit-store table, and wherein the entry is created to include an indication of validity, address data, and an indication of a data length corresponding to a number of bytes to store.

12. The multi-slice processor of claim 7, wherein the multi-slice processor is further configured to carry out:
   determining that a flush operation includes flushing the instruction prior to the issuance of the particular store instruction; and
   responsive to determining that the flush operation includes flushing the instruction prior to the issuance of the particular store instruction, generating, within the entry for the particular store instruction in the load-hit-store table, an indication of validity.

13. An apparatus comprising:
   a plurality of execution slices and an instruction sequencing unit, wherein the multi-slice processor is configured to carry out:
   receiving, at the instruction sequencing unit, a load instruction indicating load address data and a load data length;
   determining a previous store instruction in an issue queue such that store address data for the previous store instruction corresponds to the load address data, wherein the previous store instruction corresponds to a store data length;
   generating, in dependence upon the store data length matching the load data length, an indication in the issue queue that indicates a dependency between the load instruction and the previous store instruction;
   receiving an instruction indicating a target register;
   determining that the target register corresponds to a register for a particular store instruction corresponding to an entry within a load-hit-store table;
   determining, by the instruction sequencing unit, that the execution of the received instruction indicating the target register modifies data at the register for the particular store instruction, wherein the register data being modified will be used by the particular store instruction in an address calculation; and
   generating, based on the determination that execution of the received instruction indicating the target register modifies the register data used by the particular store instruction in the address calculation, an indication of invalidity within the entry for the particular store instruction in the load-hit-store table.

14. The apparatus of claim 13, wherein the indication in the issue queue that indicates the dependency indicates that the load instruction is dependent upon the previous store instruction.

15. The apparatus of claim 14, wherein the indication comprises a field setting of an entry for the load instruction in the issue queue, wherein the dependency between the load instruction and the previous store instruction is based at least upon the load instruction targeting a register used by the store instruction, and wherein the field setting includes an index into an entry of a load-hit-store table that corresponds to the previous store instruction.

16. The apparatus of claim 14, wherein the multi-slice processor is further configured to carry out:
   determining an order of issuance for the previous store instruction and the load instruction in accordance with the indication in the issue queue that indicates the dependency between the load instruction and the previous load instruction; and
   issuing, in accordance with the order of issuance, the previous store instruction to a load/store slice before issuing the load instruction to the load/store slice.

17. The apparatus of claim 13, wherein the previous store instruction corresponds to an entry of a load-hit-store table, and wherein the entry is created to include an indication of validity, address data, and an indication of a data length corresponding to a number of bytes to store.

* * * * *